(12) United States Patent
Rochat et al.

(10) Patent No.: US 11,287,023 B2
(45) Date of Patent: Mar. 29, 2022

(54) CORRECTION MECHANISM FOR A FUNCTION OF A MOVEMENT OF A TIMEPIECE

(71) Applicant: Montres Breguet S.A., L'Abbaye (CH)

(72) Inventors: Fabrice Rochat, Vallorbe (CH); Deirdre Lenoir, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 600 days.

(21) Appl. No.: 16/162,534

(22) Filed: Oct. 17, 2018

(65) Prior Publication Data

US 2019/0162288 A1 May 30, 2019

(30) Foreign Application Priority Data

Nov. 27, 2017 (EP) .................................. 17203880

(51) Int. Cl.
*G04B 27/00* (2006.01)
*F16H 55/18* (2006.01)
*G04B 13/02* (2006.01)
*G04B 35/00* (2006.01)

(52) U.S. Cl.
CPC ............. *F16H 55/18* (2013.01); *G04B 13/02* (2013.01); *G04B 27/00* (2013.01); *G04B 35/00* (2013.01)

(58) Field of Classification Search
CPC ........ G04B 13/02; G04B 35/00; G04B 27/00; F16H 55/18
See application file for complete search history.

(56) References Cited

U.S. PATENT DOCUMENTS

| 2,717,488 | A | * | 9/1955 | Linard | G04B 15/08 368/132 |
| 4,048,795 | A | * | 9/1977 | Risi | G04B 19/247 368/38 |
| 4,240,249 | A | * | 12/1980 | Malkin | G04B 19/25373 368/221 |
| 4,261,047 | A | * | 4/1981 | Nakao | G04B 19/25353 368/37 |
| 4,818,830 | A | * | 4/1989 | Bron | G04B 3/048 200/341 |
| 2007/0180943 | A1 | * | 8/2007 | Daout | F16H 55/16 74/457 |
| 2011/0205854 | A1 | | 8/2011 | Wiederrecht et al. | |

(Continued)

FOREIGN PATENT DOCUMENTS

| EP | 2 159 652 A1 | 3/2010 |
| EP | 2 672 335 A1 | 12/2013 |
| EP | 2 950 164 A1 | 12/2015 |

OTHER PUBLICATIONS

European Search Report dated May 23, 2018 in European Application 17203880.4, filed on Nov. 27, 2017 (with English Translation of Categories of Cited Documents & Written Opinion ).

(Continued)

*Primary Examiner* — Sean Kayes
(74) *Attorney, Agent, or Firm* — Oblon, McClelland, Maier & Neustadt, L.L.P.

(57) ABSTRACT

A correction mechanism for a function of a movement for a timepiece, notably a display function, including a corrector, and at least one clockwork part, notably a gear wheel, in which the clockwork part can be driven by a movement cooperating with a flexible transmission end of a movement.

20 Claims, 3 Drawing Sheets

(56) References Cited

U.S. PATENT DOCUMENTS

2012/0026845 A1* 2/2012 Richard ................ G04B 15/14
                                                                 368/127
2013/0333504 A1   12/2013 Klinger et al.
2015/0346689 A1   12/2015 Rebetez
2017/0242399 A1*  8/2017 Feyer ................... G04B 13/027

OTHER PUBLICATIONS

Chinese Office Action dated Nov. 2, 2020 in Chinese Patent Application No. 201811366573.0, 3 pages.

* cited by examiner

CORRECTION MECHANISM FOR A FUNCTION OF A MOVEMENT OF A TIMEPIECE

CROSS-REFERENCE TO RELATED APPLICATION

This application claims priority to European Patent Application No. 17203880.4 filed on Nov. 27, 2017, the entire disclosure of which is hereby incorporated herein by reference.

DOMAIN OF THE INVENTION

The invention relates to a correction mechanism for a function of a movement of a timepiece and a corrector included in this mechanism.

The invention also concerns this movement provided with such a mechanism and also the timepiece including this movement.

BACKGROUND TO THE INVENTION

In the prior art, it is often necessary to correct functions in the movements of timepieces, in particular display functions such as a date (annual, perpetual, day/date, and others) or indicators of lunar phases, tides, AM/PM display, and others. Such function corrections are conventionally effected using a correction mechanism, usually using a winding stem. However, such function corrections are often not possible or too slow to effect using such a mechanism.

Figure 1:
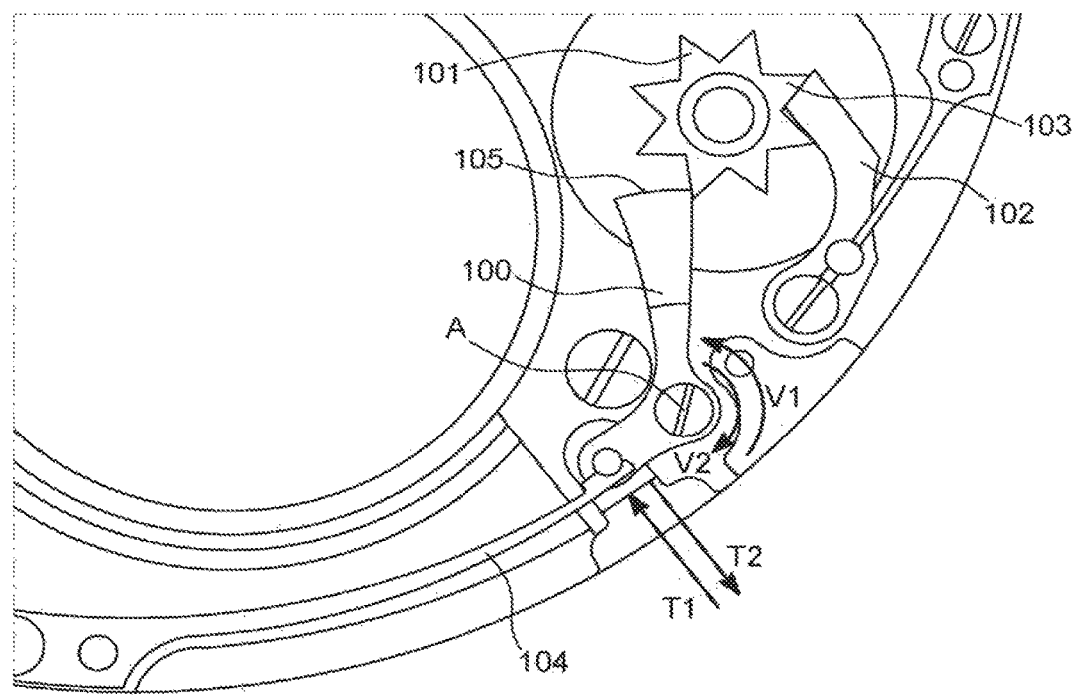

To overcome these drawbacks, there are also other known correction mechanisms, shown in FIG. 1, which normally include a push piece mounted freely on a middle of a case of a timepiece, which is linked mechanically to a corrector 100 as well as a jumper 102 provided to keep a gear wheel 101, also known as a star, in an indexed position. In this layout, when a correction is being made, the push piece, which can be moved inside the middle in two opposing directions of movement T1, T2, is driven in order to act directly or indirectly on the corrector 100 to cause this latter to effect a rotational movement about an axis of rotation A in a first direction V1 compressing a corrector spring 104 attached to the body of this corrector 100, or attached elsewhere in the movement, over an angular path limited by two stops. During this rotation in the first direction V1, this corrector 100 is able to drive the gear wheel 101 in a rotational movement, said gear wheel 101 being indexed by the jumper 102 arranged in a first space of this gear wheel 101 defined between two teeth of this latter, until the corrector 100 comes into contact with one of the two stops.

More specifically, such a corrector 100 has a free rigid transmission end 105 of a movement that is provided to come into contact with a tooth of this gear wheel 101 such as to cause a rotational movement of this latter. During this rotation, this end 105 has sufficient travel to position a slope of the head of the jumper 102 on an apex of a tooth of the gear wheel 101 separating the first space from a second space of said gear wheel 101 in order to bring this jumper 102 to a position to perform this correction function by in turn driving the gear wheel 101 in order to be positioned in the second space to lock this gear wheel 101 in a final indexed correction position once the push piece is released.

However, such a corrector mechanism 100 often lacks robustness on account of the random nature of performance of the expected correction. Indeed, it is common for the gear wheel to not be in the final indexed position as a result, for example, of the jumper 102 not managing to overcome the resistance torques of the gear wheel related for example to friction, or as a result of a shallow slope on the jumper 102 provided to avoid undesirable dynamic effects. Under these conditions, once the push piece has been released, the corrector spring exerts a return force on the corrector 100 so that the end thereof is no longer engaged with the tooth of the gear wheel, thereby causing a rotational movement of the gear wheel in a second direction V2 opposite the first direction, which moves this gear wheel 101 back to the initial indexed position.

SUMMARY OF THE INVENTION

The purpose of the present invention is to partially or fully overcome the drawbacks mentioned above by proposing a correction mechanism including a corrector that can itself move the gear wheel to the final indexed position.

For this purpose, the invention relates to a corrector designed to be incorporated into a correction mechanism of a function of a movement for a timepiece, notably a display function, said corrector having a flexible free transmission end for a movement, notably provided with an elastic member.

The presence of such an elastic member at the flexible free end of the corrector helps to increase the travel thereof, which is then considerably greater than the travel of the correctors in the prior art, notably of rigid correctors. Under these conditions, the corrector is then able to move from the final stop position to the initial stop position without causing any movement of the clockwork part, for example a gear wheel, which is then in a final indexed position and with which the corrector is able to cooperate to help correct one or more functions of the movement of the timepiece In other embodiments:
said flexible end is provided with an elastic member that can be deformed in first and second directions of deformation that are opposite one another, said elastic member being designed to stop against a bearing zone of a rigid portion of said corrector when this elastic member is stressed in the first direction of deformation,
the corrector includes the elastic member, which can be deformed in first and second directions of deformation that are opposite one another,
the elastic member can be deformed in first and second directions of deformation that are substantially parallel or parallel to the first and second directions of movement of the corrector:
the elastic member has a first contact zone defined on an outer surface of said elastic member that is designed to transmit a movement to a clockwork part of the correction mechanism when the corrector is driven in a first direction of movement,
said elastic member has a second contact zone defined on an inner surface of said elastic member that is designed to stop against a bearing zone on a rigid portion of said corrector when the elastic member is stressed,
said elastic member is linked mechanically to a first portion of the corrector only at the linking end thereof,
the corrector has an attachment end provided with a linking zone linked mechanically to a corrector spring of the correction mechanism, and
the corrector includes a mounting zone traversed by an axis of rotation about which the corrector is able to move in first and second directions of movement.

The invention also concerns a correction mechanism for a function of a movement for a timepiece, notably a display function, including such a corrector, and at least one clockwork part, notably a gear wheel, in which said clockwork part can be driven by a movement cooperating with a flexible transmission end of a movement of the corrector.

Advantageously, this correction mechanism includes a jumper that is able to hold the clockwork part in an indexed position.

The invention also concerns a movement for a timepiece including at least one such correction mechanism.

The invention also relates to a timepiece including such a movement.

SHORT DESCRIPTION OF THE DRAWINGS

Figure 2:
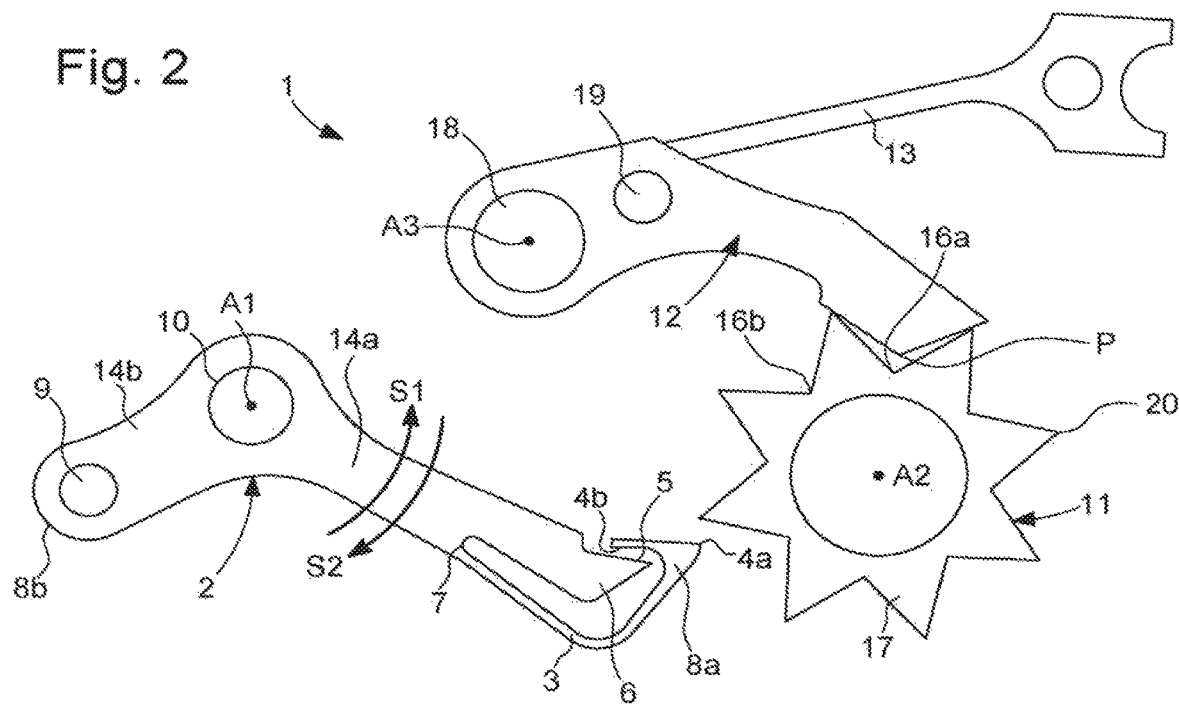
Figure 3:
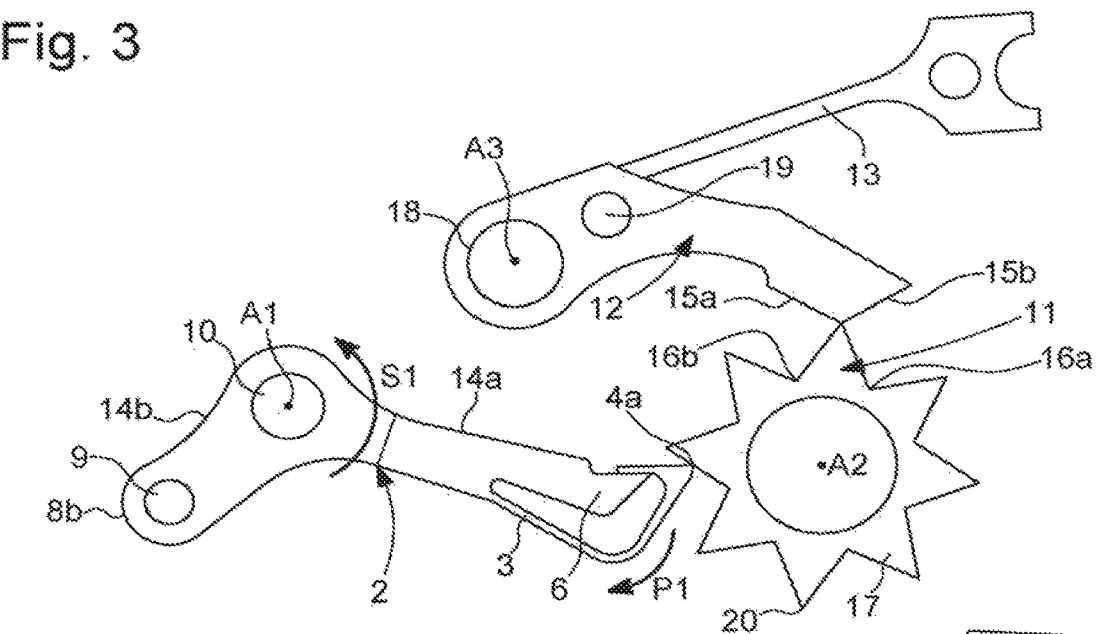
Figure 4:
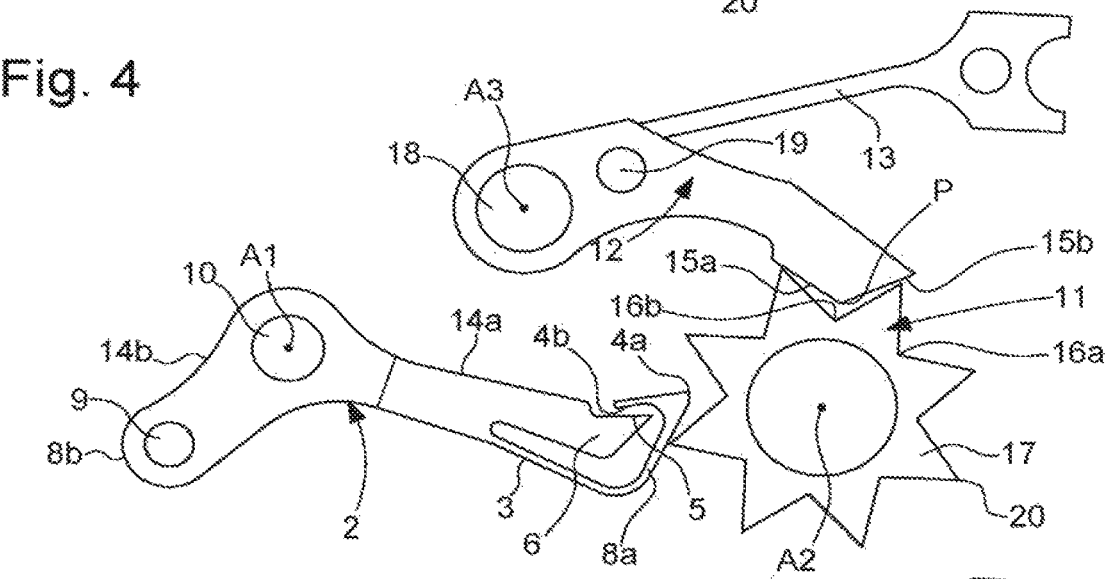
Figure 5:
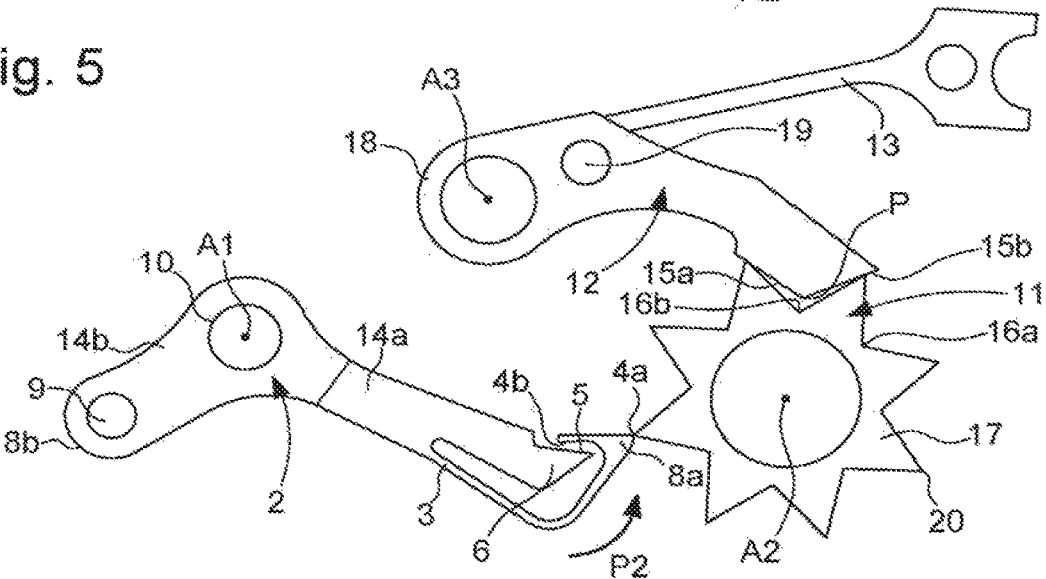
Figure 6:
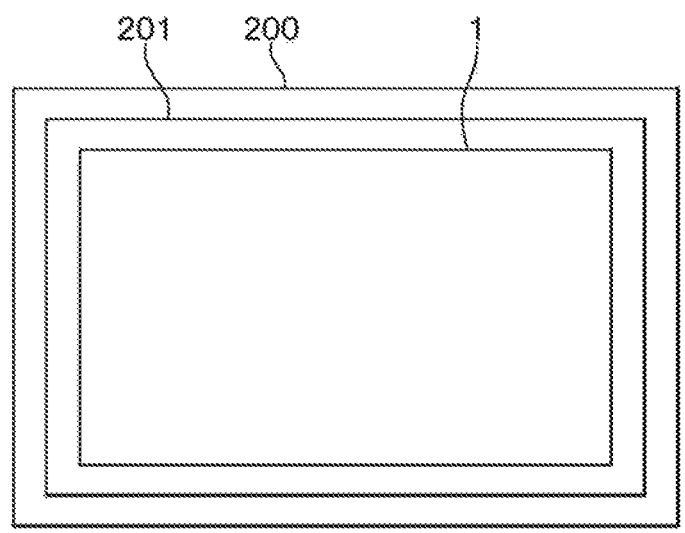

Other features and advantages are set out clearly in the description provided below as a non-limiting example, with reference to the attached drawings, in which:

FIG. 1 is a view of a correction mechanism for a function of a timepiece in the prior art, FIG. 2 is a view of a correction mechanism for a function of a timepiece in an idle phase of this mechanism according to one embodiment of the invention, FIG. 3 is a view of the correction mechanism for a function of a timepiece in an activation phase of this mechanism according to one embodiment of the invention, FIGS. 4 and 5 are views of the correction mechanism for a function of a timepiece during configuration from the activation phase to the idle phase of the mechanism according to the embodiment of the invention, and FIG. 6 is a schematic view of a timepiece including a movement provided with such a correction mechanism according to the embodiment of the invention.

DETAILED DESCRIPTION OF THE PREFERRED EMBODIMENTS

The invention relates to the domain of clockwork mechanisms, and more specifically to correction mechanisms 1 for one or more functions of a movement 201 of a timepiece 200 such as a watch. These mechanisms 1 can be controlled by the user of the timepiece 200 or be controlled automatically by an automatic drive mechanism controlled by the movement 201 of the timepiece 200.

In the present embodiment of the invention, said functions may in particular include display functions such as a date (annual, perpetual, day/date, and others) or indicators of lunar phases, tides, AM/PM display, and others. In this context, such correction mechanisms 1 are intended to correct and update the display mechanisms, which can then cooperate with at least one of these correction mechanisms 1 to correct a display function. Naturally, these corrected functions can be other functions of the movement 201 other than display functions.

In FIGS. 2 to 5, this correction mechanism 1 includes, as a non-limiting and non-exhaustive example, a push piece, a corrector 2, a jumper 12, a clockwork part 11 such as a gear wheel, a corrector spring (not shown) and a jumper spring 13. In this correction mechanism 1, the push piece, also referred to as the "push piece/corrector", is mounted moveably in a middle of a case of the timepiece 200. This push piece is designed to be actuated manually for example by the user of the timepiece 200 in a visible activation zone (not shown) of the middle, as many times are required to correct this display function. This push piece is linked directly to the corrector 2 or indirectly via a transmission system of the correction mechanism 1 in order to cause a movement of the corrector 2 in a first direction of movement P1 (shown in FIG. 2) about an axis of rotation A1 when this push piece is actuated.

In this correction mechanism 1, the corrector 2 has a mounting zone 10 helping to ensure the moveable attachment thereof to a plate of the timepiece 200. This mounting zone 10 links the first and second portions 14a, 14b together such that the shape of the corrector 2 is essentially similar to the letter "L". This mounting zone 10 has an opening that can be traversed by a screw that has a threaded end that can cooperate with a threaded orifice of the plate. Consequently, this corrector 2 is moveable in relation to the axis of rotation A1, which is perpendicular to this opening of the mounting zone 10. In addition to this mounting zone 10, this corrector 2 also has an attachment end 8b in the second portion 14b of this corrector 2 and a flexible free transmission end 8a for a movement, in this case a rotational movement, located in the first portion 14a of this corrector 2. In this layout, the mounting zone 10 is found between these two ends 8a, 8b.

In this corrector 2, the flexible free transmission end 8a for a movement, hereinafter referred to as the flexible transmission end for a movement, includes an elastic member 3. This elastic member 3 is a flexible portion and in particular the only flexible portion of the corrector 2 that is specifically designed to transmit a movement to the gear wheel 11. This elastic member 3 has first and second contact zones 4a, 4b. The first contact zone 4a is defined on an outer surface of said elastic member 3 and is involved in transmitting the movement to the gear wheel 11 of the correction mechanism 1. The second contact zone 4b is defined on an inner surface of said elastic member 3. This second contact zone 4b is designed to stop against a bearing zone 5 on a rigid portion 6 of the first portion 14a of said corrector 2 when this elastic member 3 is stressed or deformed. A gap between the bearing zone 5 and the second contact zone 4b defines the travel of this elastic member 3 during the compression or deformation of same. This elastic member 3 also has a linking end 7 linking same mechanically to the rigid portion 6 of the first portion 14a of said corrector 2. This linking end 7 is the only mechanical link between the elastic member 3 and the first portion 14a of the corrector 2.

The attachment end 8b of this corrector 2 has a linking zone 9 that is linked mechanically to the corrector spring or that simply bears against this spring. Such a linking zone 9 can be provided elsewhere in the corrector 2, for example in the first portion 14a thereof. This linking zone 9 can include a threaded opening that is able to cooperate with a screw in order to form part of this mechanical link between this spring and the corrector 2. In this layout, the corrector spring is a leaf spring with one end attached to the case of the timepiece 200, notably to a plate of this case, and another end of this spring is linked mechanically or simply bears against the linking zone 9 of the corrector 2. In an idle phase of the correction mechanism 1, this spring holds the corrector 2 in a position in which the flexible end of the corrector 2 is not engaged in the teeth 17 of the gear wheel 11. In another phase, referred to as the activation phase of the correction mechanism 1, this spring is then stressed under the action of a movement of the corrector 2 about the axis of rotation A1 resulting from actuation of the push piece by the user of the timepiece 200.

This correction mechanism 1 also has two stops designed to limit the travel of the corrector 2 during movement thereof about the axis of rotation A1. More specifically, the correction mechanism 1 includes an initial stop on which the corrector 2 rests when this latter is in the initial stop position during the idle phase of the mechanism 1, and a final stop when same is in the final stop position during the activation phase of the mechanism 1. This travel of the corrector 2 can also be referred to as the "movement travel" or "correction travel" or "maximum correction travel".

In this correction mechanism 1, the jumper 12 is designed to block the gear wheel 11 at all times other than during the correction phases of one or more functions of the movement 201. This jumper 12 is also mounted moveably in rotation about an axis of rotation A3 on the plate of this timepiece 200. Such a jumper 12 has a free end having first and second slopes 15*a*, 15*b* (shown in FIG. 3) forming an obtuse angle at a tip P of this jumper 12. This free end is notably designed to be arranged in a space 16*a*, 16*b* between two consecutive teeth 17 of the gear wheel 11, with the slopes 15*a*, 15*b* in contact with these teeth 17 in order to keep this gear wheel 11 in an indexed position. This jumper 12 also has an attachment end provided with an opening 18 that can be traversed by a screw that has a threaded end that is able to cooperate with a threaded orifice of the plate. Accordingly, this jumper 12 is therefore movable in relation to the axis of rotation A3 perpendicular to this opening 18 defined in this attachment end of the jumper 12.

The jumper 12 also has a support zone 19 that projects from one of the two side faces of this jumper 12 and that is able to cooperate with the jumper spring 13. This support zone 19 is located between the opening 18 defined in the attachment end and the free end of the jumper 12, and is located closer to this opening 18 then to the free end. The jumper spring 13 is a leaf spring with one end attached to the plate of the timepiece 200 and another end that can bear against the support zone 19 of this jumper 12. In the idle phase of the correction mechanism 1, this spring 13 holds the jumper 12 in a position in which the free end of the jumper 12 is engaged in the space 16*a*, 16*b* between consecutive teeth 17 of the gear wheel 11 in order to block this gear wheel 11 at all times other than during correction phases of one or more functions of the movement 201 and normal operation phases of the mechanism. In the activation phase of the correction mechanism 1, this spring 13 is then stressed under the action of a movement of the jumper 12 about the axis of rotation A3 resulting from the movement of the corrector 2 following actuation of the push piece.

Such a correction mechanism 1 can perform a correction method for a function of the movement 201 of the timepiece 200.

Such a method includes a configuration step for the correction mechanism 1 in an activation phase during which the gear wheel 11 is set to an indexed correction position. In this indexed correction position, the gear wheel is then able to update the display mechanism with which the gear wheel cooperates and that is involved in delivering the corrected display function of the movement 201.

During this step, the push piece is actuated and moves from an idle position to an activation position to act on the corrector 2, thereby causing same to move in the first direction S1 about the axis of rotation A1. During this movement of the corrector 2, the elastic member 3 forming the flexible end thereof comes into contact with a tooth 17 of the gear wheel 11 in order to transmit this movement to this latter in order to drive same in a rotational movement about an axis of rotation A2. More specifically and with a reference to FIG. 3, during this transmission of movement, the elastic member 3 is deformed in a first direction P1 by coming into contact with this tooth 17 until the gap between the bearing zone 5 and the second contact zone 4*b* is zero. In other words, the elastic member 3 is deformed until this second contact zone 4*b* stops against the bearing zone 5 of the rigid portion 6 of the first portion 14*a* of the corrector 2. In this mechanism 1, the torque applied by the elastic member 3 to the gear wheel 11 is less than the holding torque applied to the gear wheel 11 by the jumper 12.

Consequently, since this second contact zone 4*b* is stopped against the bearing zone 5, the corrector 2 then drives the gear wheel 11 in a rotational movement about the axis of rotation A2 until the corrector 2 bears against the final stop that marks the end-of-travel position thereof. During this rotational movement of the gear wheel 11, the jumper 12, which is in contact with the teeth 17 of this gear wheel 11, also effects a rotational movement about the axis of rotation A3 causing a deformation of the jumper spring 13, until the tip P thereof is positioned on the other side of the apex 20 of the tooth 17 of the gear wheel 11 separating the first space 16*a* in which this jumper 12 was initially positioned from a second consecutive space 16*b* of the gear wheel 11 in which this jumper 12 is then positioned, before completing the corrected function, i.e. locking this gear wheel 11 in a final indexed correction position. Preferably, the final stop position of the corrector 2 makes it possible to bring this tooth 17 between these first and second spaces 16*a*, 16*b*, and notably the apex 20 thereof, to the second slope 15*b* of the jumper. Thus, in this mechanism 1, the travel of the corrector 2 is therefore specifically defined to ensure a movement of the gear wheel 11 that causes the free end of the jumper 12 to move from the first space 16*a* to the second space 16*b*. At the end of this travel of the corrector 2, notably when the first contact zone 4*a* thereof is no longer in contact with the tooth 17, the elastic member 3 expands to return to the initial shape thereof. In this context, therefore, when the corrector 2 is moving from the initial stop position to the final stop position thereof, this latter actuates the gear wheel such that the apex 20 of this tooth 17 moves firstly over some or all of the first slope 15*a*, then over the tip P of this jumper 12, and finally over some or all of the second slope 15*b*.

This procedure then includes a configuration step for the correction mechanism 1 in an idle phase. When the corrector 2 is thus bearing against the end stop, the push piece is then arranged in the idle position thereof, having been released by the user of the timepiece 200. In this context, the corrector 2 then returns to the initial position thereof under the action of a return force exerted on this latter by the corrector spring, which is able to drive same in movement in a second direction S2 about the axis of rotation A1. This second direction S2 is opposite the first direction S1. This movement of the corrector 2 has no effect on the indexed correction position of the gear wheel 11. Indeed, when the corrector 2 returns to the initial position thereof, the elastic member 3 comes into contact, at the first contact zone 4*a* thereof, with a tooth 17 of the gear wheel 11 and is then deformed in a second direction P2 opposite the first direction P1, without driving this gear wheel 11 in a movement about the axis of rotation A2. In this mechanism 1, the torque applied by the elastic member 3 to the gear wheel 11 is less than the holding torque applied to the gear wheel 11 by the jumper 12. In this context, FIG. 5 shows a maximum deformation of this elastic member 3 when this latter is in contact with an apex 20 of the tooth 17. During this deformation, the gap between the bearing zone 5 and the second contact zone 4*b* gets smaller but never reaches zero. In other words, the elastic member 3 is deformed without the second contact zone 4*b* butting against the bearing zone 5 of the rigid portion 6 of the first portion 14*a* of the corrector 2. Additionally, this elastic member 3 can be deformed in first and second directions of deformation P1, P2 that are substantially parallel or parallel to the first and second directions of movement S1, S2 of the corrector 2.

In other words, the flexible end is provided with this elastic member that can be deformed in these first and second directions of deformation P1, P2 that are opposite one another, said elastic member being designed to stop against the bearing zone of the rigid portion of said corrector when the elastic member is stressed in the first direction of deformation P1. Thus, the travel of this corrector is increased such that this corrector is able to move from the final stop position thereof to the initial stop position thereof without causing the movement of a clockwork part such as a gear wheel then in a final indexed position and with which same is able to cooperate to help correct one or more functions of the movement of the timepiece. Indeed, as a general rule in the prior art, the jumper completes the correction function by indexing the gear wheel and locking the position of this gear wheel. However, this latter is not always able to overcome the resistance torques (friction, etc.) or sometimes, in order to prevent undesirable dynamic effects, the slopes of the jumper are kept shallow and do not enable the gear wheel to be moved to an indexed position. In this latter case, the travel of this rigid corrector needs to be lengthened in order to complete the function in place of the jumper, by moving the gear wheel to a near-end position during correction However, such a lengthening of this travel necessarily causes the corrector to drive the gear wheel again when returning to the initial position thereof.

Furthermore, the corrector 2 bears against the initial stop that marks the end-of-travel position of the corrector 2 when this latter is set to the initial position thereof.

The invention therefore makes it possible to simplify correcting a function of a movement 201 of a timepiece 200, notably by increasing the maximum correction travel compared to the travel of correctors in the prior art, while improving the robustness thereof without requiring the addition of an additional part such as an attached removable finger. Furthermore, such a mechanism 1 does not occupy additional space in the case of the timepiece 200 and is easy to incorporate into existing movements.

The invention claimed is:

1. A corrector configured to be incorporated into a correction mechanism for a function of a movement for a timepiece, said corrector comprising:
   a flexible transmission end for the movement, said flexible transmission end having an elastic member configured to be deformed in first and second directions of deformation that are opposite one another, wherein
   said elastic member is configured to stop against a bearing zone of a rigid portion of said corrector when the elastic member is stressed in the first direction of deformation,
   the elastic member partially surrounds the rigid portion, and
   a torque applied by the elastic member to a clockwork part is less than a holding torque applied to the clockwork part by a jumper, the juniper being configured to hold the clockwork part in an indexed position.

2. The corrector according to claim 1, wherein the elastic member is configured to be deformed in the first and second directions of deformation that are substantially parallel or parallel to first and second directions of movement of the corrector.

3. The corrector according to claim 1, wherein said elastic member has a first contact zone on an outer surface of said elastic member that is configured to transmit the movement to the clockwork part of the correction mechanism when the corrector is driven by a movement in a first direction of movement.

4. The corrector according to claim 1, wherein said elastic member has a second contact zone on an inner surface of said elastic member that is configured to stop against the bearing zone of the rigid portion of said corrector when the elastic member is stressed.

5. The corrector according to claim 1, wherein said elastic member is linked mechanically to a first portion of the corrector only at a linking end thereof.

6. The correction mechanism according to claim 5, wherein
   two surfaces of the elastic member are positioned opposite to each other across the rigid portion,
   one of the two surfaces faces the bearing zone, and
   the other of the two surfaces is linked to the linking end.

7. The corrector according to claim 1, further comprising an attachment end provided with a linking zone linked mechanically to a corrector spring of the correction mechanism or simply bearing against the corrector spring.

8. The corrector according to claim 1, further comprising a mounting zone traversed by an axis of rotation wherein the corrector is able to move in first and second directions of movement.

9. A correction mechanism for a function of a movement for a timepiece, comprising:
   the corrector according to claim 1, and
   the clockwork part, wherein
   said clockwork part is configured to be driven by the movement by cooperating with the flexible transmission end of the movement of the corrector.

10. The correction mechanism according to claim 9, further comprising the jumper.

11. A movement for a timepiece comprising at least one correction mechanism according to claim 9.

12. A timepiece comprising the movement according to claim 11.

13. The correction mechanism according to claim 9, wherein said function is a display function.

14. The correction mechanism according to claim 9, wherein said clockwork part is a gear wheel.

15. The correction mechanism according to claim 14, wherein the corrector and the gear wheel are not engaged in an idle phase.

16. The correction mechanism according to claim 15, wherein the corrector is freely rotatable about an axis of rotation in the idle phase.

17. The correction mechanism according to claim 15, wherein the corrector moves to the idle phase by virtue of the elasticity of the elastic member.

18. The correction mechanism according to claim 9, further comprising a push piece which causes a movement of the corrector when the push piece is actuated.

19. The corrector according to claim 1, wherein said function is a display function.

20. The corrector according to claim 1, wherein
   the corrector is configured to move the clockwork part to a final indexed position, and
   the elastic member allows the corrector to move the clockwork part to the final indexed position and allows the corrector to return to an initial stop position after moving the clockwork part to the final indexed position without causing any movement of the clockwork part.

* * * * *

UNITED STATES PATENT AND TRADEMARK OFFICE
CERTIFICATE OF CORRECTION

| | |
|---|---|
| PATENT NO. | : 11,287,023 B2 |
| APPLICATION NO. | : 16/162534 |
| DATED | : March 29, 2022 |
| INVENTOR(S) | : Rochat et al. |

It is certified that error appears in the above-identified patent and that said Letters Patent is hereby corrected as shown below:

In the Claims

In Column 7, Claim 1, Line 56, delete "juniper" and insert -- jumper --, therefor.

Signed and Sealed this
Second Day of August, 2022

Katherine Kelly Vidal
*Director of the United States Patent and Trademark Office*